United States Patent
Peron

(10) Patent No.: US 8,461,814 B2
(45) Date of Patent: Jun. 11, 2013

(54) BOOST/BUCK CONVERTER AND METHOD FOR CONTROLLING IT

(75) Inventor: Benoît Peron, Tours (FR)

(73) Assignee: STMicroelectronics (Tours) SAS, Tours (FR)

(*) Notice: Subject to any disclaimer, the term of this patent is extended or adjusted under 35 U.S.C. 154(b) by 300 days.

(21) Appl. No.: 12/840,674

(22) Filed: Jul. 21, 2010

(65) Prior Publication Data
US 2011/0018518 A1    Jan. 27, 2011

(30) Foreign Application Priority Data
Jul. 23, 2009  (FR) ...................................... 09 55135

(51) Int. Cl.
*G05F 1/575* (2006.01)
*G05F 1/577* (2006.01)
*G05F 1/585* (2006.01)

(52) U.S. Cl.
USPC ............................ 323/267; 323/271; 323/284

(58) Field of Classification Search
USPC .................. 323/267, 268, 271, 284, 288, 282
See application file for complete search history.

(56) References Cited

U.S. PATENT DOCUMENTS

| | | | |
|---|---|---|---|
| 7,298,116 B2* | 11/2007 | Sluijs ............................. | 323/222 |
| 8,049,472 B2* | 11/2011 | Easwaran et al. ............. | 323/267 |
| 8,159,202 B2* | 4/2012 | Boling et al. ................. | 323/284 |
| 2002/0105307 A1 | 8/2002 | Groeneveld et al. | |
| 2003/0117209 A1 | 6/2003 | Tsuchiya et al. | |
| 2004/0027104 A1* | 2/2004 | Ishii et al. ..................... | 323/267 |
| 2005/0110471 A1* | 5/2005 | Mayega et al. ............... | 323/267 |
| 2006/0214648 A1 | 9/2006 | Liu et al. | |
| 2008/0224678 A1* | 9/2008 | Tobin et al. ................... | 323/283 |

FOREIGN PATENT DOCUMENTS

| | | |
|---|---|---|
| DE | 3316251 A1 | 11/1984 |
| DE | 1020060324 A1 | 10/2000 |
| JP | 2000287441 A | 1/2008 |

OTHER PUBLICATIONS

French Search Report dated May 10, 2010 from corresponding French Application No. 09/55135.

\* cited by examiner

*Primary Examiner* — Adolf Berhane
*Assistant Examiner* — Fred E Finch, III
(74) *Attorney, Agent, or Firm* — Wolf, Greenfield & Sacks, P.C.

(57) ABSTRACT

A power supply circuit capable of providing two regulated voltages based on a D.C. input voltage, including a boost converter and a buck-boost converter, the circuit including a single inductive element common to the boost and buck-boost converters.

14 Claims, 8 Drawing Sheets

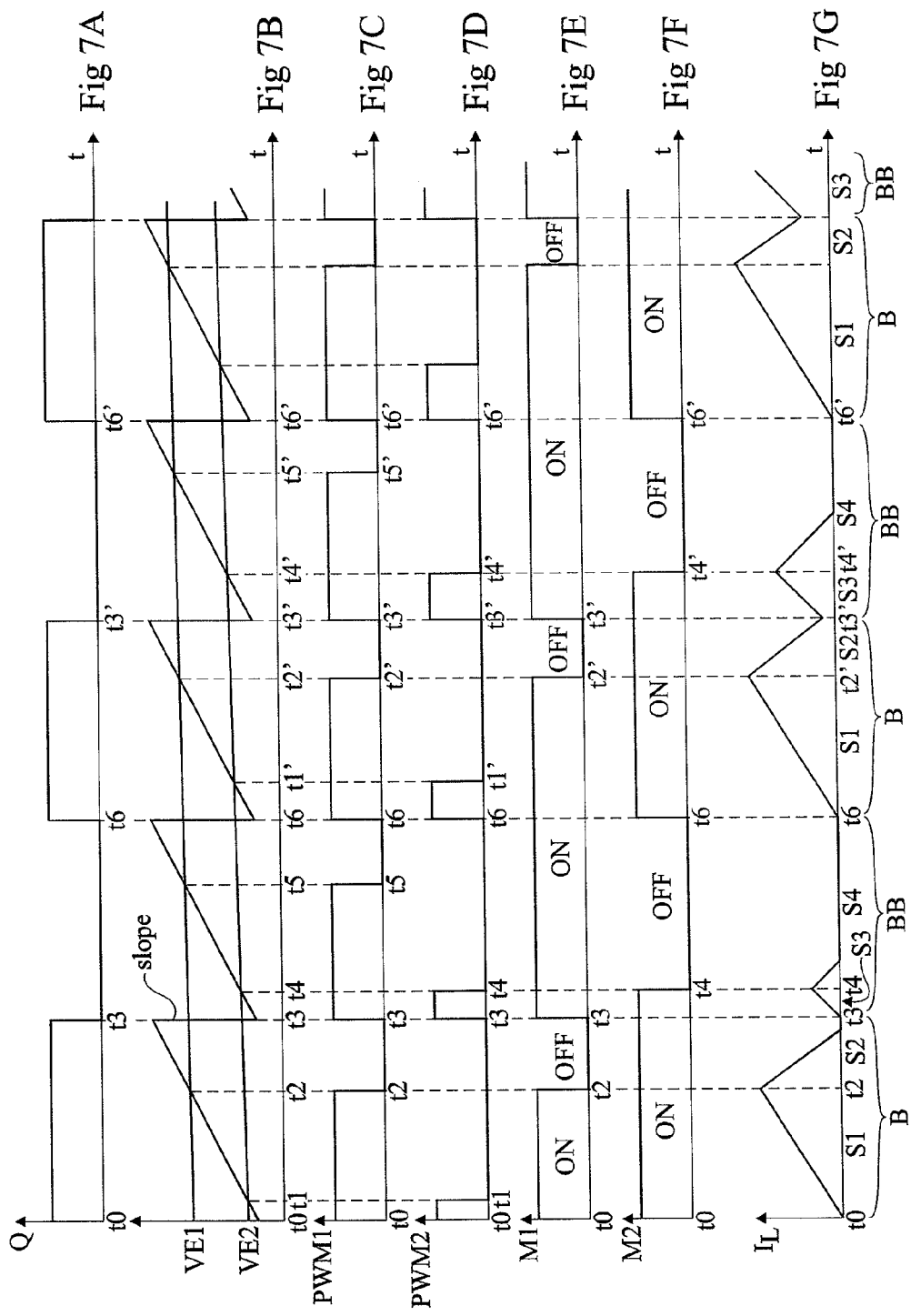

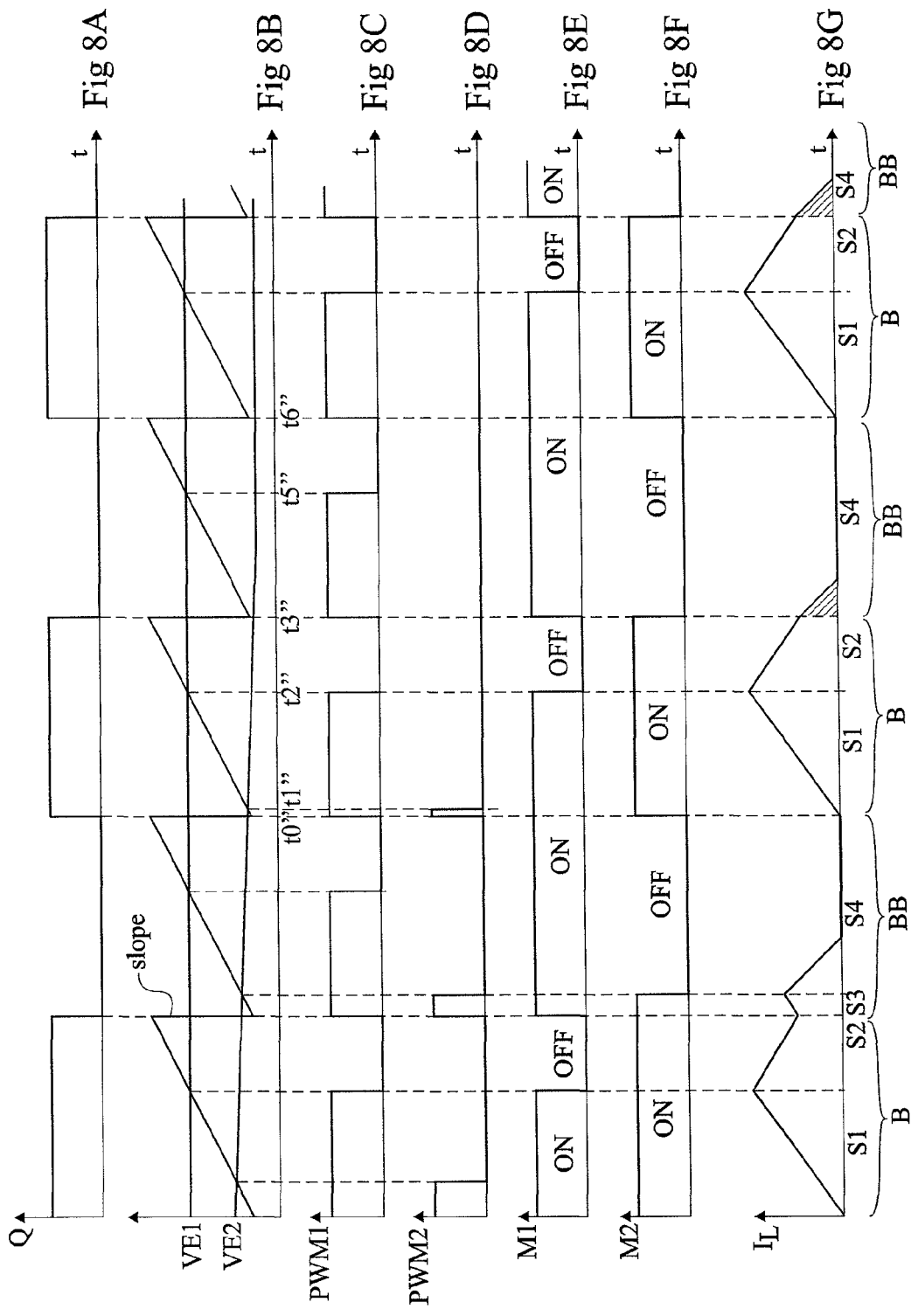

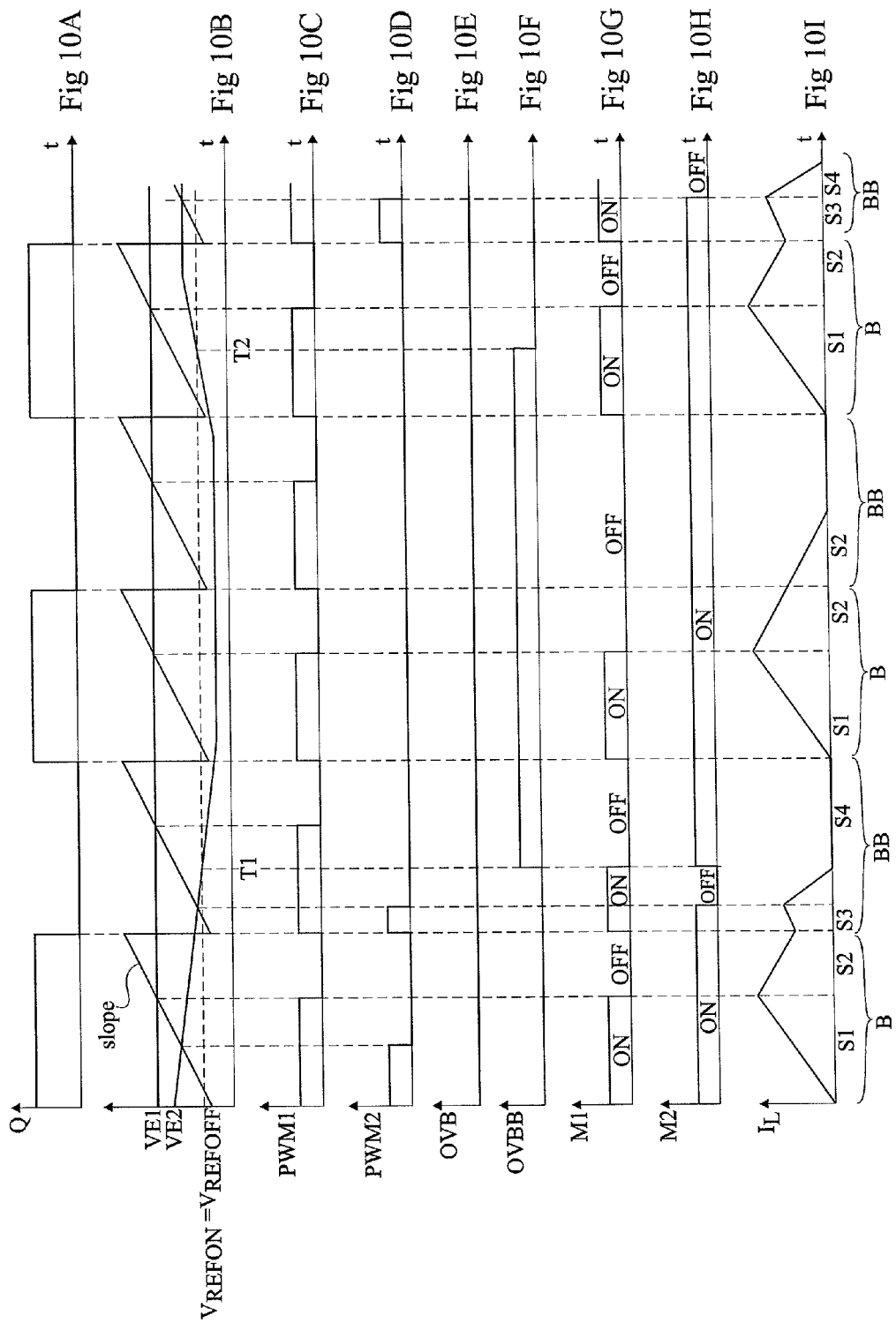

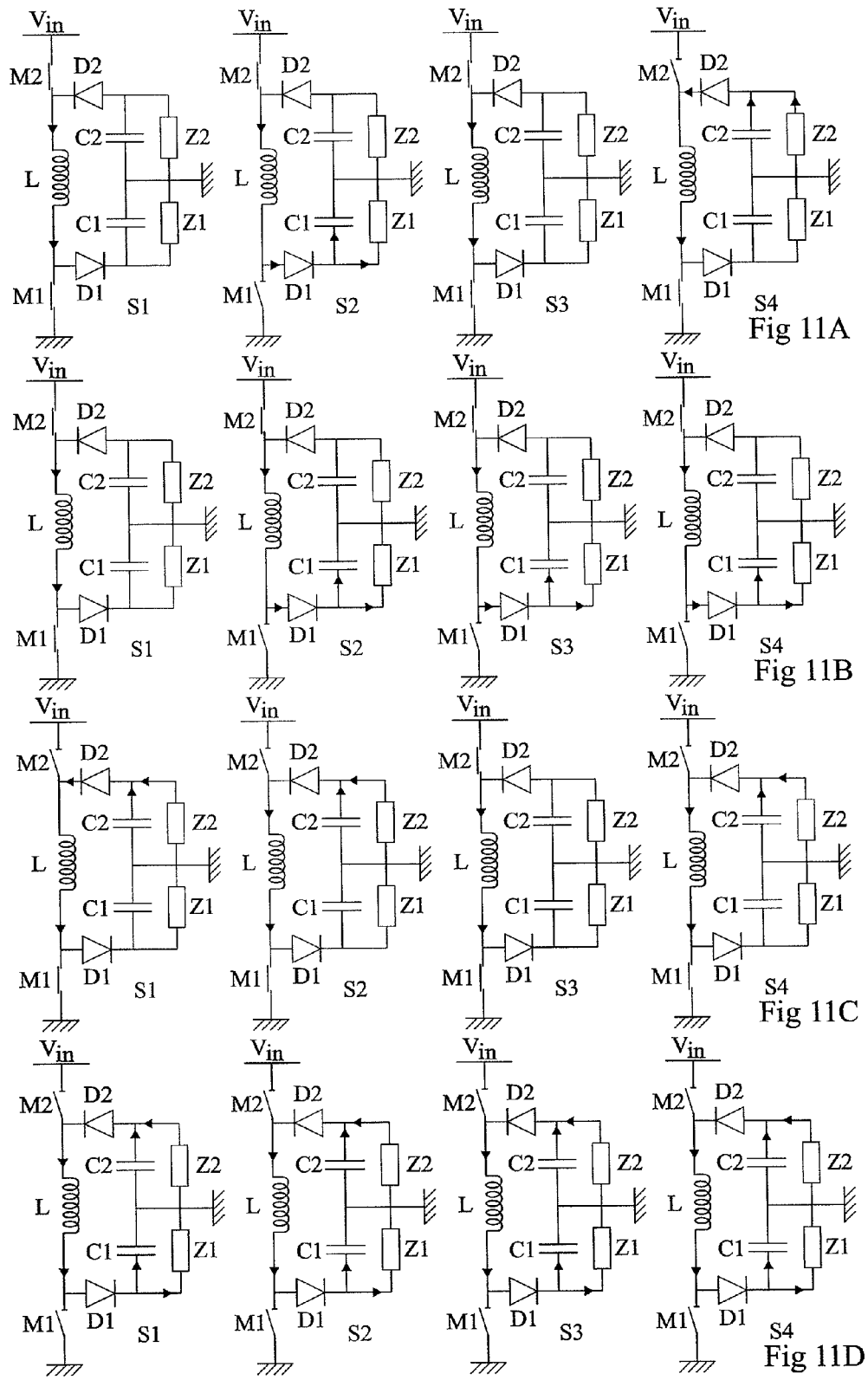

US 8,461,814 B2

BOOST/BUCK CONVERTER AND METHOD FOR CONTROLLING IT

CROSS REFERENCE TO RELATED APPLICATIONS

This application claims the priority benefit of French patent application number 09/55135, filed on Jul. 23, 2009, entitled "BOOST/BUCK-BOOST CONVERTER AND METHOD FOR CONTROLLING IT," which is hereby incorporated by reference to the maximum extent allowable by law.

BACKGROUND OF THE INVENTION

1. Field of the Invention

The present invention relates to voltage converters and, more specifically, to a converter enabling a conversion of switched-mode voltage step-up or boost type in parallel with a conversion of switched-mode voltage inversion type (with respect to a reference, generally the ground) (buck-boost).

2. Discussion of the Related Art

FIG. 1 partially and schematically shows a pixel 1 of a monochrome LCD screen or a sub-pixel of a color LCD screen of the type to which the present invention more specifically applies. Each pixel 1 is formed of a control switch M (typically a thin-film MOS transistor, TFT) and of a capacitance C1 as a memory cell. A first conduction terminal of switch M is connected to a column conductor Col, common to all switches in the display screen column. The other conduction terminal of switch M is connected to a first electrode of capacitance C1 of the pixel, having its second electrode connected to ground, the dielectric of capacitance C1 being formed of the liquid crystal used for the display and of a storage capacitor in parallel (not shown). The gates of switches M are connected, in rows, to row conductors Row. The presence of switch M generates a Miller-effect capacitive element C between its gate and its source, and thus between row Row and the first electrode of capacitance C1 of cell 1. Column conductors Col are driven by a column control circuit 2 (C DRIVER) generally setting the luminance reference levels while row conductors Row are driven in scan mode by a row control circuit 3 (R DRIVER).

For a color screen, each cell 1 forms a sub-pixel of a color pixel and the color is provided by a corresponding chromatic filter (RGB) arranged in front of each sub-pixel.

FIG. 2 schematically and partially shows the equivalent electric diagram of a liquid crystal display 10 and of its row driver. In the example of FIG. 2, only two columns $Col_i$ and $Col_{i+1}$ have been shown. Similarly, only five rows $Row_1$, $Row_2$, $Row_3$, $Row_{n-1}$, and $Row_n$ have been shown. The integration of the display on a substrate generally made of glass is no longer limited to the cells but also concerns the row drivers. These drivers comprise, for each row, an RS-type flip-flop B1, B2, B3, . . . Bn−1, and Bn having a direct Q output used to control a switch KR1, KR2, KR3, KRn−1, KRn placed on each row conductor to bring a power supply voltage thereon. The S activation input of first flip-flop B1 receives a scan start signal Start. The S activation input of flip-flop B2 is connected to row $Row_1$, downstream of switch KR1 with respect to the power source, the S activation input of flip-flop B3 is connected to row $Row_2$, downstream of switch KR2, etc., until the S activation input of last flip-flop Bn connected to row $Row_{n-1}$, downstream of switch KRn−1. The R reset inputs of the flip-flops are respectively connected to the conductor of the row of next rank, downstream of the corresponding flip-flop KR, until the R input of last flip-flop Bn which is looped back on row $Row_1$.

The rows are generally powered by a row scanning. The rows of odd rank $Row_1$, $Row_3$, . . . , $Row_{n-1}$ are all connected upstream of switches KR1, KR3, . . . KRn−1 to a terminal 32 while the rows of even rank $Row_2$, . . . $Row_n$ are, upstream of their respective switches, connected to a terminal 33. Terminals 32 and 33 are respectively connected to the junction points of pairs of switches Q1 and Q2, respectively Q3 and Q4, series-connected between terminals of application of a respective high turn-on voltage $V_{ON}$ and low turn-off voltage $V_{OFF}$.

The scanning is performed row by row, starting, for example, from an odd row by turning on switches Q1 and Q4 and turning off switches Q2 and Q3 so as to, at the same time, supply this odd row and force the turning-off of the even row of next rank. Signal Start applied to the S activation input of first flip-flop B1 enables an automatic row scanning. The addressing of an even row is performed symmetrically by turning off switches Q1 and Q4 and by turning on switches Q2 and Q3. Switches Q1 to Q4 are thus switched at the rate of the row scanning under control of a circuit 5 (CTRL).

To avoid power losses that are too high, a charge recovery stage is generally provided, which enables, for each column, to use the power stored in the pixels to be turned off in the row which has just been addressed, to help the lighting of the pixels of the next row. For this purpose, terminals 32 and 33 are generally connected by an assembly of two antiparallel diodes D1 and D2, each in series with a resistor R1 and R2 and a switch S1 and S2 controlled by circuit 5.

Before the screen is powered up, signal Start is activated to initialize all flip-flops B1 to Bn, after which the signal disappears to enable to start the scanning. To turn on the pixels of the first odd row, switches Q1 and Q4 are turned on, which causes the application of a voltage $V_{ON}$ on terminal 32 and of a voltage $V_{OFF}$ on terminal 33. A current can then flow to charge the capacitances of pixels of this first row. At the end of this addressing period, transistors Q1 and Q4 are turned off, switch S1 is turned on and switch S2 is turned off during a so-called power recovery or transfer phase, which enables to precharge the next (even) row with the discharge of the odd row which has just been addressed. This phase sets the first odd and even rows to an intermediary equilibrium voltage. Then, switches Q2 and Q3 are turned on to pull the voltage of the even row to level $V_{ON}$ and end the discharge of the first odd row to level $V_{OFF}$. At the end of the lighting of the first even row, switches Q2 and Q3 are turned off, switches S2 is turned on and switch S1 is turned off to enable a precharge of the next odd row and thus resume the operation by turning-on of switches Q1 and Q4.

For the same screen resolution, that is, an identical ratio between the number of rows and the number of columns, it is generally desired to increase the number of rows and to decrease the number of columns. Indeed, row drivers which manage the power supply are generally less complex than column drivers which manage data and, further, row drivers are generally integrated on the glass for cost reasons. However, the use of many integrated row control circuits on glass implies the need for a power supply capable of providing a significant power.

It is thus desired to provide a power supply that can generate voltages $V_{ON}$ and $V_{OFF}$ and can provide a high power, from a single D.C. voltage. For this purpose, the use of chopper or switched-mode devices enabling either a conversion of boost or pull-up type, or a conversion of buck-boost type is known.

FIG. 3 illustrates a known circuit 40 that can generate voltages $V_{ON}$ and $V_{OFF}$ based on a D.C. input signal $V_{in}$. Circuit 40 comprises a first portion 42 providing a boost converter intended to generate voltage $V_{ON}$ and a second portion 44 forming a buck-boost converter intended to generate voltage $V_{OFF}$. Portions 42 and 44 are connected in parallel on input signal $V_{in}$.

Boost converter 42 comprises, between the terminals of application of voltage $V_{in}$, a series connection of an inductance $L_b$ and of a switch $M_b$ controlled by a signal $K_b$, a terminal of the switch being grounded. A diode $D_b$ having its anode connected to the junction point of inductance $L_b$ and switch $M_b$ and having its cathode connected to a first terminal of a capacitor $C_b$, the second terminal of capacitor $C_b$ being grounded is placed in parallel with switch $M_b$. Output voltage $V_{ON}$ of converter 42 is measured across capacitor $C_b$.

Buck-boost converter 44 comprises, between the terminals of application of voltage $V_{in}$, a series association of a switch $M_{bb}$ controlled by a signal $K_{bb}$ and of an inductance $L_{bb}$ having one of its terminals connected to ground. A diode $D_{bb}$ having its cathode connected to the junction point of switch $M_{bb}$ and inductance $L_{bb}$, and having its anode connected to a first terminal of a capacitor $C_{bb}$, the second terminal of the capacitor being grounded is placed in parallel with inductance $L_{bb}$. Voltage $V_{OFF}$ is measured across capacitive element $C_{bb}$.

To perform the conversions by chopping, switches $M_b$ and $M_{bb}$ are controlled to be turned off and on at high frequency, typically from several tens to several hundreds of kilohertz, which enables storing magnetic power in each of inductances $L_b$ and $L_{bb}$ when the associated switches are turned on and to output this power from converters 42 and 44 when the associated switches are off. Continuously, boost converter 42 delivers a voltage $V_{ON}$ having a value greater than voltage $V_{in}$ and buck-boost converter 44 delivers a voltage $V_{OFF}$ which is smaller than voltage $V_{in}$ and negative.

A circuit such as shown in FIG. 3 has the disadvantage of comprising two inductive elements which are, be it in integrated circuit technology or on glass, extensive electronic elements, and thus expensive. Thus, there is a need for a circuit that can generate, from a single D.C. voltage, a regulated voltage of higher value and a regulated voltage having a sign opposite to that of this D.C. voltage using a single inductive element.

SUMMARY OF THE INVENTION

An object of an embodiment of the present invention is to provide a circuit that can provide, from a D.C. input signal and by means of two switched-mode converters, two regulated signals, one being of a higher value than the input signal and the other having a negative value with respect to a reference, the circuit comprising a single inductive element.

Another object of an embodiment of the present invention is to provide a circuit comprising elements that can inhibit the operation of one of the converters when the load associated with this converter requires no power and to supply the unused power to the other converter.

Thus, an embodiment of the present invention provides a power supply circuit capable of providing two regulated voltages based on a D.C. input voltage, comprising a boost converter and a buck-boost converter, the circuit comprising a single inductive element common to the boost and buck-boost converters.

According to an embodiment of the present invention, the circuit further comprises means for alternating the chopping periods between the two converters.

According to an embodiment of the present invention, the means assign, when a load associated with a converter requires no power supply, its chopping period to the other converter to provide the power stored in the inductive element thereto.

According to an embodiment of the present invention, each converter comprises a unidirectional dipole, a capacitive element, and a chopper switch, each chopper switch being controlled by a control circuit capable of controlling the regulated voltages.

According to an embodiment of the present invention, the control circuit comprises a logic circuit and a circuit for comparing the regulated voltages with reference regulated voltages.

According to an embodiment of the present invention, the comparison circuit comprises: first and second comparators comparing, respectively, the first of the regulated voltages with the first of the reference regulated voltages and the second of the regulated voltages with the second of the reference regulated voltages, and providing first and second comparison signals; a slope generator; third and fourth comparators comparing, respectively, the first comparison signal with the signal generated by the slope generator and the second comparison signal with the signal provided by the slope generator, the output of the third and fourth comparators being connected to the input of the logic circuit; and fifth and sixth comparators comparing, respectively, the first comparison signal with a first reference inhibition signal and the second comparison signal with a second reference inhibition signal, the output of the fifth and sixth comparators being connected to the input of the logic circuit.

According to an embodiment of the present invention, the first and second reference inhibition signals are equal to the minimum voltage provided by the slope generator to which a voltage ranging between 20 and 200 mV is added.

According to an embodiment of the present invention, the logic circuit is capable of turning off the two switches when the loads associated with the two converters require no power supply.

According to an embodiment of the present invention, each chopper switch is formed of a MOS transistor.

An embodiment of the present invention further provides a method for controlling a power supply circuit such as defined hereabove in which, during a first half-cycle, the D.C. input voltage is applied across the inductive element to store power therein, after which the inductive element is led to transmit the stored power to the voltage step-up converter and, during a second half-cycle, the D.C. input voltage is applied across the inductive element to store power therein, after which the inductive element is led to transmit the stored power to the buck-boost converter.

The foregoing objects, features, and advantages of the present invention will be discussed in detail in the following non-limiting description of specific embodiments in connection with the accompanying drawings.

BRIEF DESCRIPTION OF THE DRAWINGS

FIGS. 7A to 7G are timing diagrams illustrating the normal operation of the circuit of FIG. 6;

FIGS. 8A to 8G are timing diagrams illustrating the operation of the circuit of FIG. 6 in a specific case;

FIGS. 10A to 10I are timing diagrams illustrating the operation of the circuit of FIG. 9; and FIGS. 11A to 11D illustrate the operation of the circuit of FIG. 9 in different circuit control configurations.

DETAILED DESCRIPTION

Figure 1:
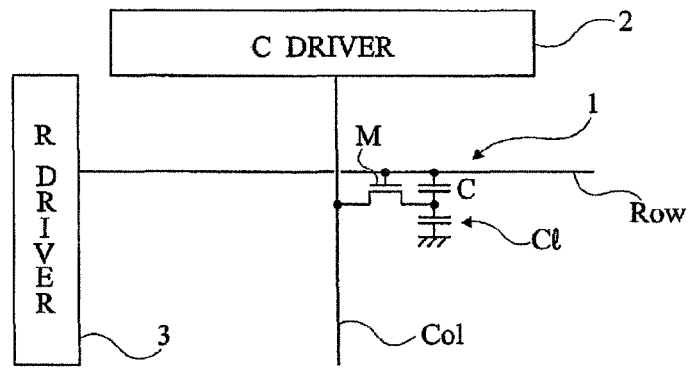
FIG. 1, previously described, shows a pixel of a monochrome LCD or a sub-pixel of a color LCD.
Figure 2:
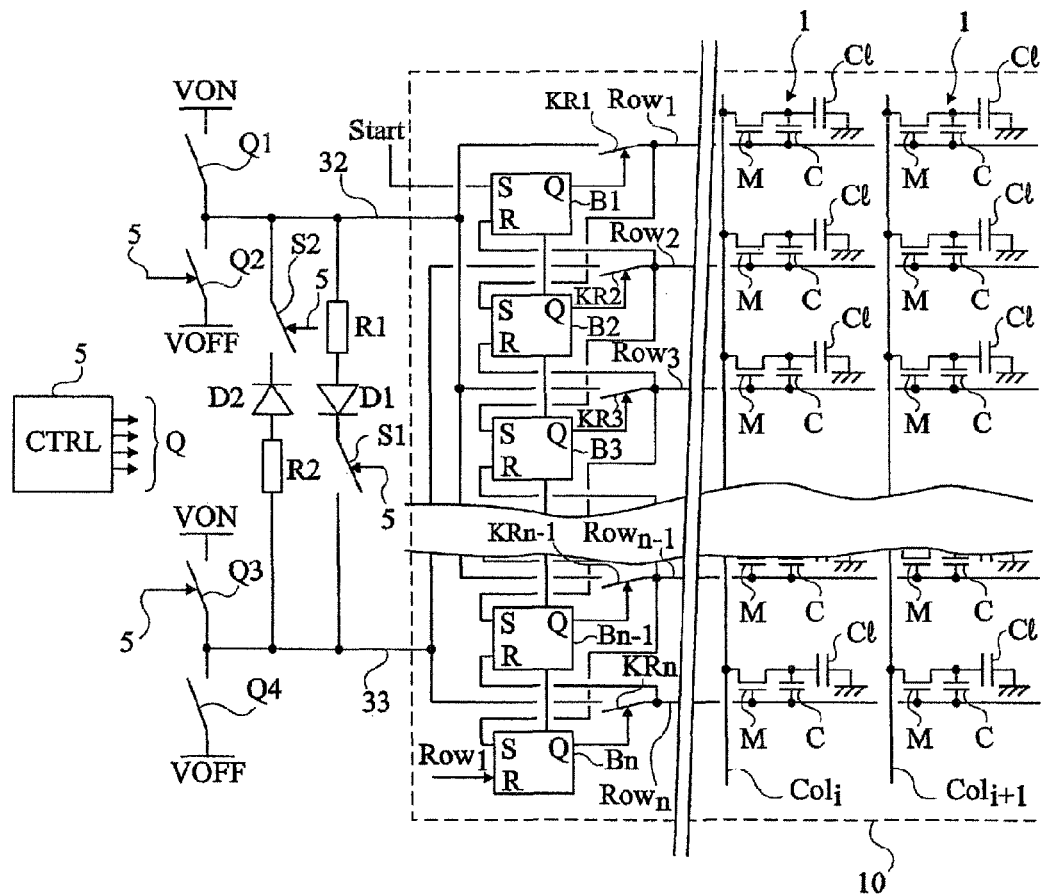
FIG. 2, previously described, partially shows the equivalent electric diagram of a liquid crystal display screen and of its row control circuit.
Figure 3:
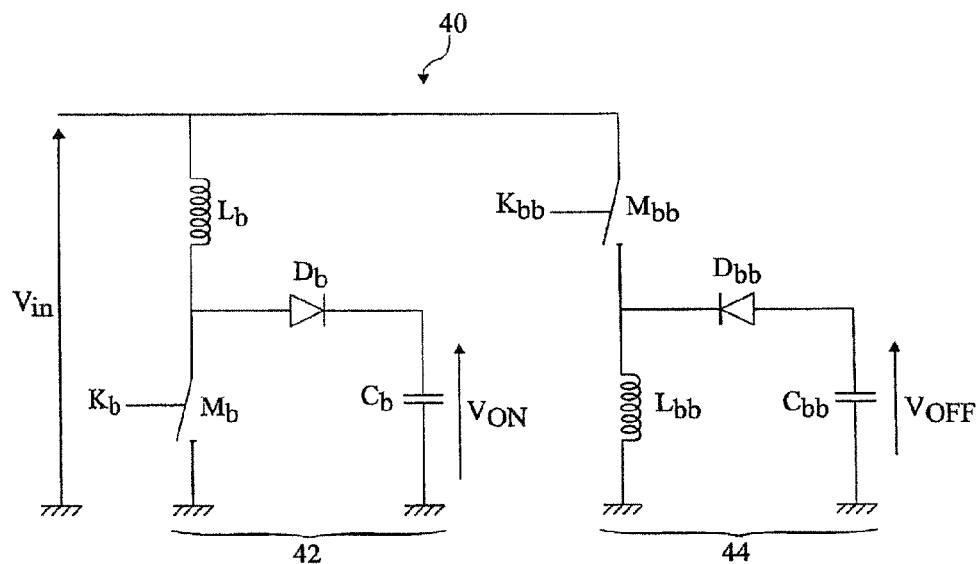
FIG. 3, previously described, shows a known example of a circuit for powering the circuit of FIG. 2.

It should be noted that, in the following description, the same elements have been designated with the same reference numerals in the different drawings.

For clarity, only those elements which are useful to the understanding of the present invention have been shown and will be described. In particular, the precise operation of the boost and buck-boost converters will not be described in detail.

Figure 4:
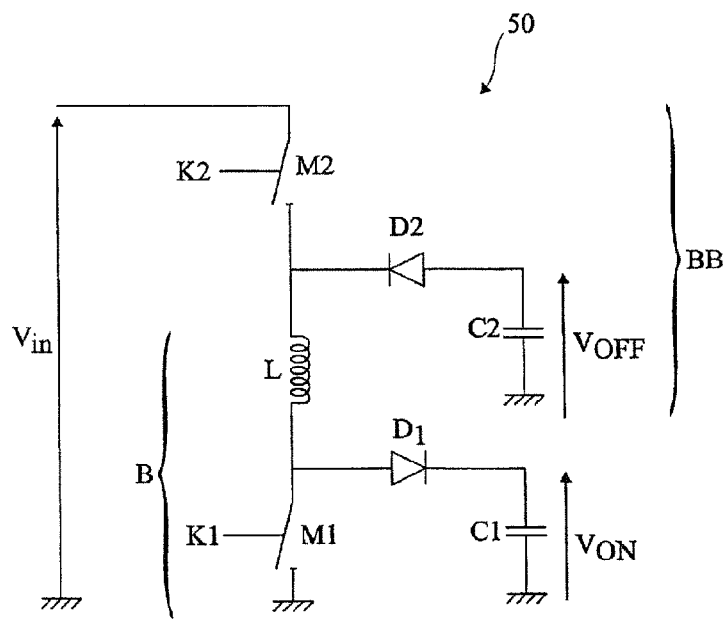
FIG. 4 shows a power supply circuit according to an embodiment of the present invention.

FIG. 4 illustrates a circuit 50 for generating two regulated voltage signals $V_{ON}$ and $V_{OFF}$ based on a single D.C. input voltage $V_{in}$ comprising a single inductive element according to an embodiment of the present invention. The circuit comprises a first portion B forming a boost converter enabling to generate a signal $V_{ON}$ and a second portion BB forming a converter of buck-boost type enabling to generate a signal $V_{OFF}$.

The circuit comprises, between two terminals of application of D.C. input voltage $V_{in}$, a series connection of a switch M2, of a switch M1, and of an inductive element L, inductive element L being placed between switches M1 and M2. Switch M2 has one of its terminals connected to ground and is controlled by a control signal K2. Switch M1 is controlled by a control signal K1.

A branch comprising a unidirectional dipole, for example, a diode D2, and a capacitive element, for example, a capacitor C2, starts from the junction point of switch M2 and inductive element L. The cathode of diode D2 is connected to the junction point of switch M2 and of inductive element L and a terminal of capacitor C2 is grounded. Voltage $V_{OFF}$ is measured across capacitor C2, a load to be powered (not shown) being connected in parallel on capacitor C2.

A branch comprising a unidirectional dipole, for example, a diode D1, and a capacitive element, for example, a capacitor C1, starts from the junction point of inductive element L and switch M1. The anode of diode D1 is connected to the junction point of inductive element L and of switch M1 and a terminal of capacitor C1 is grounded. Voltage $V_{ON}$ is measured across capacitor C1, a load to be powered (not shown) being connected in parallel on capacitor C1.

Figure 5A:
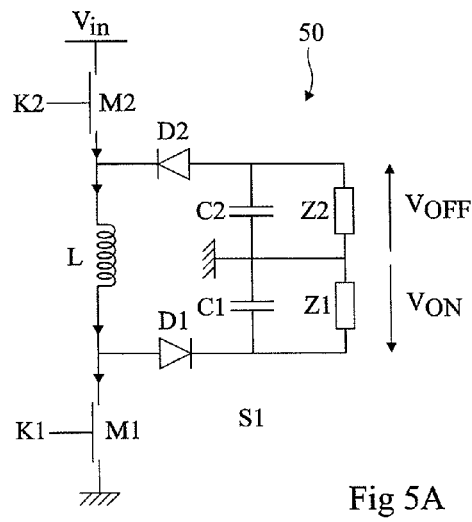
FIGS. 5A to 5D illustrate the operation of the circuit of FIG. 4.
Figure 5B:
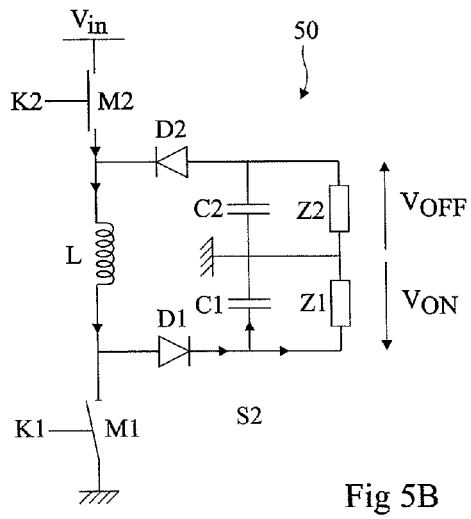
Figure 5C:
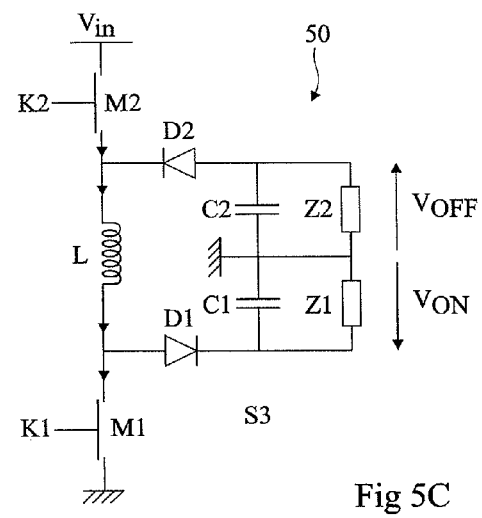
Figure 5D:
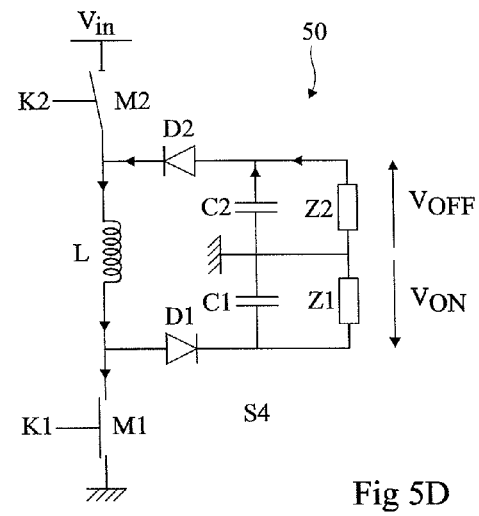

FIGS. 5A to 5D shows the respective states of the circuit of FIG. 4 during four operating phases S1 to S4. Steps S1 and S2 of FIGS. 5A and 5B are steps involving the boost converter and steps S3 and S4 of FIGS. 5C and 5D are steps involving the buck-boost converter. Loads (typically, the screen rows), illustrated in the form of impedances Z1 and Z2, are placed in parallel, respectively, with capacitors C1 and C2.

At step S1 illustrated in FIG. 5A, control signals K1 and K2 are provided so that switches M1 and M2 are turned on. Voltage $V_{in}$ is then applied across inductive element L, which causes the storage of magnetic power therein. During this step, diodes D1 and D2 are off and loads Z1 and Z2 can consume the power stored, respectively, in capacitors C1 and C2.

At step S2 illustrated in FIG. 5B, control signals K1 and K2 are provided so that switch M1 is turned off and switch M2 is turned on. The power stored in the inductive element is then transferred into boost circuit B and thus into diode D1, capacitor C1, and load Z1. This step is a first free wheel period.

At step S3 illustrated in FIG. 5C, the circuit is in the same configuration as at the step of FIG. 5A, that is, switches M1 and M2 are on. This enables recharging inductive element L with magnetic power.

At step S4 illustrated in FIG. 5D, control signals K1 and K2 are provided so that switch M2 is off and switch M1 is on. The power stored in the inductive element is then transferred into buck-boost circuit BB, that is, into diode D2, capacitor C2, and load Z2. This step thus is a second free wheel period.

Thus, over one clock period, the steps of generation of voltages $V_{ON}$ and $V_{OFF}$ alternate and a cycle comprises two steps of power storage in the inductive element and two free wheel steps.

Figure 6:
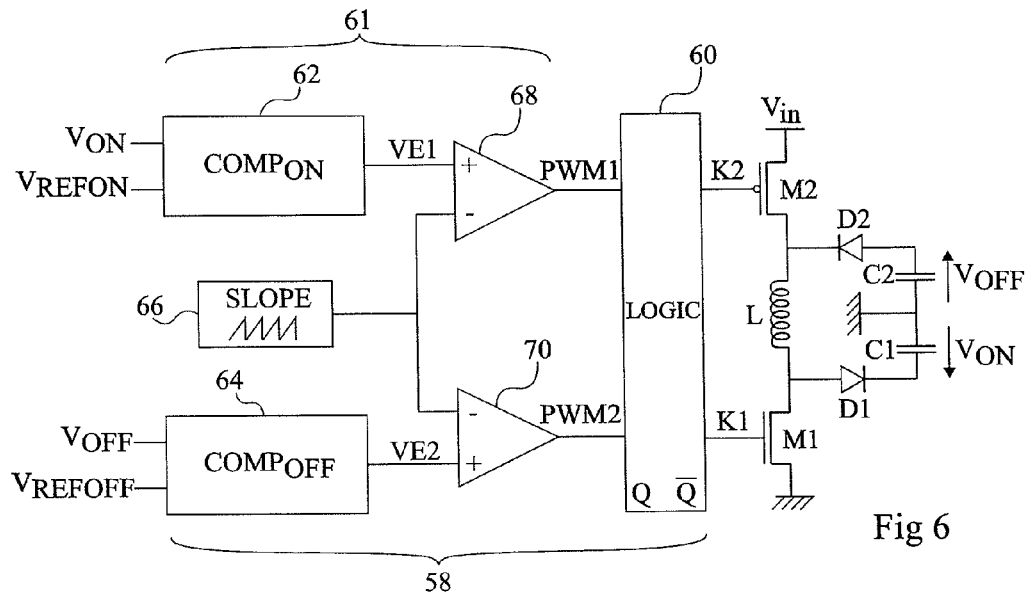
FIG. 6 shows the control circuit of the circuit of FIG. 4.

FIG. 6 details an example of a circuit 58 for driving switches M1 and M2 for controlling voltages $V_{ON}$ and $V_{OFF}$. In FIG. 6, switches M1 and M2 are shown as being transistors operating in chopping mode, transistor M1, for example, having an N channel and transistor M2 having a P channel. The gates of transistors M1 and M2 are connected to the output of a logic circuit 60 (LOGIC) synchronized on a clock Q delivered by a clock generator (not shown) and comprising two inputs PWM1 and PWM2 originating from a comparison circuit 61.

Comparison circuit 61 comprises four inputs, two of which receive voltages $V_{ON}$ and $V_{OFF}$ and two of which receive reference signals $V_{REFON}$ and $V_{REFOFF}$. A first comparator 62 ($COMP_{ON}$) is intended to provide a signal VE1 representative of the difference between signals $V_{REFON}$ and $V_{ON}$ and a second comparator 64 ($COMP_{OFF}$) is intended to provide a signal VE2 representative of the difference between signals $V_{REFOFF}$ and $V_{OFF}$. Thus, signals VE1 and VE2 are inversely proportional to the variation of signals $V_{ON}$ and $V_{OFF}$.

A first comparator 68 receives signal VE1 on one of its inputs and a signal originating from a slope generator 66 (SLOPE) on its other input. A second comparator 70 receives signal VE2 on one of its inputs and the signal originating from slope generator 66 on its other input. The outputs of first and second operational amplifiers 68 and 70 are respectively called PWM1 and PWM2.

Logic circuit 60 receives at its input signals PWM1 and PWM2 and delivers signals K1 and K2 for driving transistors M1 and M2.

FIGS. 7A to 7G are timing diagrams illustrating the operation of the circuit of FIG. 6 in a case of conventional operation. FIG. 7A illustrates clock signal Q, FIG. 7B shows the signal generated by slope generator 66 and signals VE1 and VE2, FIGS. 7C and 7D respectively illustrate signals PWM1 and PWM2, FIGS. 7E and 7F respectively illustrate the states of transistors M1 and M2, and FIG. 7G shows current $I_L$ flowing through inductive element L.

The operation of the circuit of FIG. 6 is described in the case where the circuit operates as a boost converter (step S1 and S2) when clock signal Q is in the high state and as a buck-boost converter (steps S3 and S4) when clock signal Q is in the low state. It should be noted that the inverse is also possible.

A first step S1 of a half-cycle of boost type (B) starts at a time t0 when clock signal Q switches to the high state. At this time t0, the signal from slope generator 66 (slope) is minimum and voltages VE1 and VE2 are greater than the signal from slope generator 66, which sets signals PWM1 and PWM2 to the high state and turns on transistors M1 and M2.

At a time t1, signal VE2 becomes smaller than the signal from slope generator 66, which switches signal PWM2 to the low state. At a time t2, signal VE1 becomes smaller than the signal from slope generator 66, which switches signal PWM1 to the low state (step S2). At a time t3, clock Q switches to the low state (step S3, buck-boost half-cycle), which resets the signal from slope generator 66 and switches signals PWM1 and PWM2 to the high state (voltages VE1 and VE2 then being greater than signal slope). At a time t4, signal slope becomes greater than signal VE2 (step S4), which switches signal PWM2 to the low state and, at a time t5, signal slope becomes greater than signal VE1, which switches signal PWM1 to the low state. At a time t6, clock signal Q switches back to the high state (step S1), which resets the slope of slope generator 66 and starts a new half-cycle of boost type.

One has logic equations: $M1=\overline{Q}+PWM1$ and $M2=\overline{Q}+PWM2$.

Thus, between times t0 and t2, switches M1 and M2 are on, which enables the flowing of a current $I_L$ in inductive element L and the increase of this current. Between times t2 and t3, switch M1 is off and current $I_L$ decreases, this current being "transferred" to the boost circuit (free wheel). Between times t3 and t4, switches M1 and M2 are on, which increases the value of the current flowing through inductive element L and, between times t4 and t6, switch M2 is off and current $I_L$ decreases (free wheel), this current being "transferred" by the buck-boost circuit.

In the first cycle shown in FIGS. 7A to 7G, the boost and buck-boost conversions are of discontinuous type, that is, at times t3 and t6, current $I_L$ in inductive element L is zero.

In the second shown cycle (characteristic times referenced as those of the first cycle with a'), the operation is continuous-discontinuous. Since voltage VE1 has varied, due to a variation of voltage $V_{ON}$ at the output of the boost circuit (the load placed so that this circuit consumes more power), the time interval between times t6 and t2' increases and the time interval between t2' and t3' decreases. Boost half-cycle B then is of "continuous" type since, at time t3', current $I_L$ in inductive element L is not zero. The buck-boost mode however remains discontinuous in this second cycle.

FIGS. 8A to 8G illustrate timing diagrams of the circuit of FIG. 6 in a specific case of operation where one of the loads consumes next to no power.

The first cycle shown in these drawings is similar to the second cycle of FIGS. 7A to 7G (continuous/discontinuous). The second cycle starts at a time t0" and, during steps S1 and S2 of this second cycle (clock Q in the high state, between times t0" and t3"), the operation carries on conventionally (boost-type half-cycle). The current in inductive element L is not zero at time t3".

The theoretical buck-boost type half-cycle (BB) starts at time t3". At this time, signal VE2 is smaller than the signal provided by slope generator 66 (slope). This may be due to the fact that load Z2 associated with the buck-boost converter consumes no power or no more power (disconnected load, for example). Signal PWM2 thus remains in the low state at time t3" and between times t3" and t6". Switch M2 turns off at time t3" and remains off until time t6". Thus, between times t3" and t6" of the buck-boost half-cycle, the power stored in inductive element L is transferred to the buck-boost converter (step S4, hatched portion of FIG. 8G), although the load Z2 associated with this circuit requires no additional power. Thus, an overvoltage appears at the output of the buck-boost converter.

It would be preferable to avoid overvoltages and to redistribute to the other converter the power initially intended for one of the boost or buck-boost converters while said converter does not need it.

Figure 9:
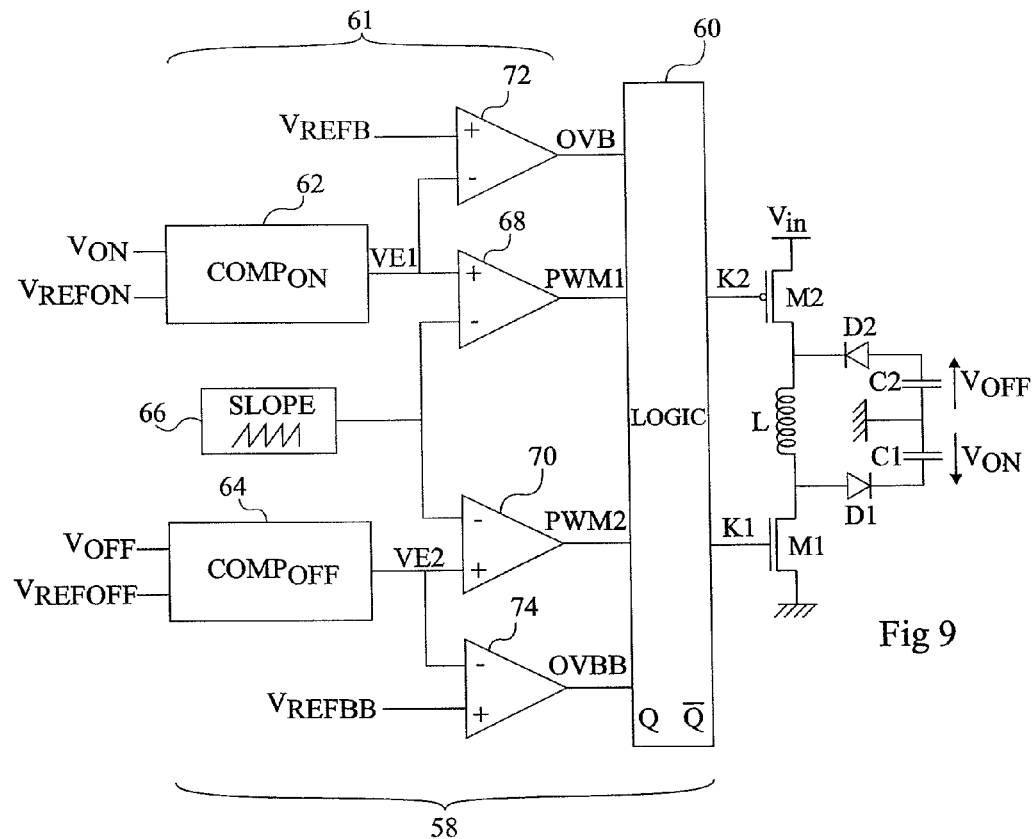
FIG. 9 shows a variation of the circuit according to an embodiment of the present invention.

FIG. 9 illustrates another embodiment of the circuit for generating voltages $V_{OFF}$ and $V_{ON}$. The shown circuit comprises all the elements of the circuit of FIG. 6 and further comprises, in comparison circuit 61, two comparators 72 and 74, for example, operational amplifiers having their outputs provided to the input of logic circuit 60 (LOGIC).

Comparator 72 receives as inputs signal VE1 and a reference signal $V_{REFB}$ and delivers an output OVB to the input of logic circuit 60. Comparator 74 receives as inputs signal VE2 and a reference signal $V_{REFBB}$ and delivers an output OVBB to the input of logic circuit 60.

Logic circuit 60 is provided to perform the following logic operations:

$$K1=[((\overline{Q}+PWM1)\cdot\overline{OVBB}+(Q\cdot PWM1)\cdot OVBB)+OVB]\cdot(\overline{OVB+OVBB}), \text{ and}$$

$$K2=[((Q+PWM2)\cdot\overline{OVB}+(\overline{Q}\cdot PWM2)\cdot OVB)+OVBB]\cdot(\overline{OVB+OVBB}).$$

The operation of the circuit of FIG. 9 is shown in the timing diagrams of FIGS. 10A to 10I, which illustrate clock signal Q (FIG. 10A), signals VE1, VE2, originating from slope generator 66 (slope), $V_{REFON}$ and $V_{REFOFF}$ (FIG. 10B), signals PWM1 (FIG. 10C), PWM2 (FIG. 10D), OVB (FIG. 10E), and OVBB (FIG. 10F), the states of transistors M1 (FIG. 10G) and M2 (FIG. 10H), and the curve of current $I_L$ (FIG. 10I).

In the shown example, voltages $V_{REFOFF}$ and $V_{REFON}$ slightly greater than the minimum voltage provided by slope generator 66, for example greater than this voltage by a voltage ranging between 20 and 200 mV, for example, 100 mV are selected. It should be noted that voltages $V_{REFOFF}$ and $V_{REFON}$ may also be distinct from each other for an asymmetrical operation, according to the desired use of the circuit.

The first shown boost half-cycle (steps S1 and S2) is conventional, the power in inductive element L being provided to the boost converter. The first buck-boost half-cycle (steps S3 and S4) starts conventionally, switches M1 and M2 being on, after which switch M1 is turned off, with current $I_L$ in inductive element L increasing, then decreasing. At a time T1 of the second part (free wheel S4) of this half-cycle, voltage VE2 becomes smaller than voltage $V_{REFON}$, which switches signal OVBB to the high state. The circuit operation is then modified. As long as signal OVBB is in the high state during the buck-boost half-cycle, switch M2 is forced to turn on, which inhibits the operation of the buck-boost converter, and switch M1 is forced to turn off, which enables, if power is stored in the inductive element at the beginning of buck-boost converter BB, to provide this power to the boost converter. During the boost half-cycle, the circuit operation is conventional (first phase S1 with switch M1 on, second phase S2 with switch M1 off).

Signal OVBB is in the high state during the entire shown half-cycle. Thus, once the boost half-cycle has been carried out (steps S1 and S2), steps S3 and S4 are dedicated to the boost circuit, which prolongs step S2.

At a time T2 (for example, during step S1 of a boost cycle B), signal VE2 becomes greater than signal $V_{REFON}$, which forces signal OVBB to the low state and enables the circuit to operate normally.

Thus, the circuit shown in FIG. 9 can inhibit one of the two converters when the load associated with this converter requires no power and to redistribute a possible excess power (if the half-cycle is continuous) to the other converter. Further, in the case where the two loads associated with the converters require no power (signals OVB and OVBB in the high state), logic circuit 60 is provided to control the turning off of switches M1 and M2, which disconnects the circuit.

FIGS. 11A to 11D illustrate the operation of the circuit of FIG. 9 according to different states of signals OVB and OVBB, during a cycle S1 to S4.

FIG. 11A illustrates the conventional operation of the circuit when signals OVB and OVBB are in the low state. The operation then is the same as that described in relation with FIGS. 5A to 5D. At step S1, switches M1 and M2 are on, which stores power in inductive element L. During step S2 (M1 off, M2 on), the power stored in inductive element L is provided to the boost converter (C1 and Z1). At step S3, switches M1 and M2 are turned back on to store power in inductive element L and, at step S4 (M1 on, M2 off), the power stored in inductive element L is provided to the buck-boost converter (C2 and Z2).

FIG. 11B illustrates the circuit operation when signal OVB is in the low state and signal OVBB is in the high state. During step S1, the two switches M1 and M2 are on, which stores power in inductive element L. During step S2 (M1 off, M2 on), the power stored in inductive element L is provided to the boost converter (C1 and Z1). At steps S3 and S4, conversely to what should normally happen (M1 and M2 on, then M2 off), the circuit remains in the configuration of step S3, which still enables to transfer power to boost converter B.

FIG. 11C illustrates the circuit operation when signal OVB is in the high sate and signal OVBB is in the low state. During steps S1 and S2, conversely to what should normally happen (M1 and M2 on, then M1 off), the circuit remains in the configuration of power transmission to the buck-boost circuit, that is, with switch M2 off and switch M1 on. At step S3, both switches M1 and M2 are on, which stores power in inductive element L and the fourth step of the cycle is of buck-boost type (M2 off, M1 on), the power stored in inductive element L being provided to the buck-boost circuit (C2 and Z2).

FIG. 11D illustrates the circuit operation when signals OVB and OVBB are in the high state. In this case, the circuit remains off during all operation steps S1 to S4, that is, switches M1 and M2 are off.

Thus, advantageously, the provided circuit can redistribute the power stored in the inductive element to one of the converters when the load associated with the other converter requires no power. Such a circuit thus enables avoiding forming of overvoltages at the output of the converters, and thus to better distribute the power provided by the boost and buck-boost converters.

Specific embodiments of the present invention have been described. Various alterations and modifications will occur to those skilled in the art. In particular, in the drawings, switches M1 and M2 are shown as being specific MOS transistors. It should be noted that any type of device forming a controllable switch may be used to form switches M1 and M2. Similarly, inductive element L and capacitive elements C1 and C2 may be of any known type, for example, a series or parallel association of several inductive or capacitive elements. It should further be noted that the comparators of comparison circuit 61, and especially comparators 68 and 70, may be hysteresis comparators. Further, the power supply circuit disclosed herein may power any adapted circuit other than an electronic circuit associated with an LCD, such as for example organic light-emitting diode displays (OLED).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A power supply circuit capable of providing two regulated voltages based on a D.C. input voltage, comprising a boost converter, a buck-boost converter, and an inductive element common to the boost and buck-boost converters, each converter comprising a chopper switch being controlled by a control circuit, the control circuit comprising a logic circuit and a comparison circuit, the comparison circuit comprising:

first and second comparators comparing, respectively, a first of the regulated voltages with a first reference voltage and a second of the regulated voltages with a second reference voltage, and providing first and second comparison signals;

a slope generator;

third and fourth comparators comparing, respectively, the first comparison signal with a signal generated by the slope generator and the second comparison signal with the signal provided by the slope generator, outputs of the third and fourth comparators being connected to inputs of the logic circuit; and fifth and sixth comparators comparing, respectively, the first comparison signal with a first reference inhibition signal and the second comparison signal with a second reference inhibition signal, outputs of the fifth and sixth comparators being connected to inputs of the logic circuit, wherein the control circuit is configured to inhibit a first converter of the converters when a load associated with the first converter requires no power and to redistribute excess power to a second converter of the converters, wherein a first output of the logic circuit, adapted to control the first chopper switch, delivers a signal having the logic equation:

$$K1 = [((\overline{Q}+PWM1)\cdot\overline{OVBB}+(Q\cdot PWM1)\cdot OVBB)+OVB]\cdot(\overline{OVB+OVBB}), \text{ and}$$

a second output of the logic circuit, adapted to control the second chopper switch, delivers a signal having the logic equation:

$$K2 = [((Q+PWM2)\cdot\overline{OVB}+(\overline{Q}\cdot PWM2)\cdot OVB)+OVBB]\cdot(\overline{OVB+OVBB}),$$

Q being a clock signal, $\overline{Q}$ being the inverse of the clock signal, PWM1, PWM2, OVB and OVBB being, respectively, the output signal of the third, fourth, fifth and sixth comparators, $\overline{OVB}$ and $\overline{OVBB}$ being, respectively, the inverse signals of OVB and OVBB.

2. The circuit of claim 1, wherein each converter further comprises a unidirectional dipole and a capacitive element.

3. The circuit of claim 1, wherein the first and second reference inhibition signals are equal to the minimum voltage provided by the slope generator to which a voltage ranging between 20 and 200 mV is added.

4. The circuit of claim 1, wherein the logic circuit is capable of turning off the two switches when the loads associated with the two converters require no power supply.

5. The circuit of claim 1, wherein each chopper switch is formed of a MOS transistor.

6. A method for controlling the power supply circuit of claim 1, wherein:

during a first half-cycle, the D.C. input voltage is applied across the inductive element to store power therein, after which the inductive element is led to transmit the stored power to the boost converter; and during a second half-cycle, the D.C. input voltage is applied across the inductive element to store power therein, after which the inductive element is led to transmit the stored power to the buck-boost converter.

7. A power supply circuit configured to provide regulated voltages based on a D.C. input voltage, comprising:
   a boost converter, a buck-boost converter and an inductive element common to the boost converter and the buck-boost converter, wherein each converter comprises a chopper switch; and
   a control circuit configured to control the chopper switches, the control circuit comprising:
      first and second comparators configured to compare, respectively, a first of the regulated voltages with a first reference voltage and a second of the regulated voltages with a second reference voltage, and to provide first and second comparison signals;
      a slope generator configured to generate a slope signal;
      third and fourth comparators configured to compare, respectively, the first comparison signal with the slope signal and the second comparison signal with the slope signal, and to provide outputs;
      fifth and sixth comparators configured to compare, respectively, the first comparison signal with a first reference inhibition signal and the second comparison signal with a second reference inhibition signal, and to provide outputs; and
      a logic circuit configured to receive the outputs of the third, fourth, fifth and sixth comparators and to control the chopper switches of the boost converter and the buck-boost converter based on the received outputs of the third, fourth, fifth and sixth comparators, wherein a first output of the logic circuit, adapted to control the boost converter, delivers a signal having the logic equation:

$K1 = [((\overline{Q}+PWM1) \cdot \overline{OVBB}+(Q \cdot PWM1) \cdot OVBB)+OVB] \cdot (\overline{OVB}+\overline{OVBB})$, and a second output of the logic circuit, adapted to control the buck-boost converter, delivers a signal having the logic equation:

$K2 = [((Q+PWM2) \cdot \overline{OVB}+(\overline{Q} \cdot PWM2) \cdot OVB)+OVBB] \cdot (\overline{OVB}+\overline{OVBB})$, Q being a clock signal, $\overline{Q}$ being the inverse of the clock signal, PWM1 PWM2, OVB and OVBB being, respectively, the output signal of the third, fourth, fifth and sixth comparators, $\overline{OVB}$ and $\overline{OVBB}$ being, respectively, the inverse signals of OVB and OVBB.

8. A power supply circuit as defined in claim 7, wherein each converter further comprises a diode and a capacitive element.

9. A power supply circuit as defined in claim 7, wherein the logic circuit is configured to turn off the chopper switches when the loads associated with the boost converter and the buck-boost converter require no power supply.

10. A power supply circuit as defined in claim 7, wherein each of the converters includes a chopper switch comprising a MOS transistor.

11. A power supply circuit as defined in claim 7, wherein the control circuit is configured to inhibit the boost converter when a load associated with the boost converter requires no power and to redistribute excess power to the buck-boost converter, and to inhibit the buck-boost converter when a load associated with the buck-boost requires no power and to redistribute excess power to the boost converter.

12. A method for controlling a power supply circuit configured to provide regulated voltages based on a D.C. input voltage, the power supply circuit including a boost converter, a buck-boost converter and an inductive element common to the boost converter and the buck-boost converter, comprising:
   comparing a first of the regulated voltages with a first reference voltage to provide a first comparison signal;
   comparing a second of the regulated voltages with a second reference voltage to provide a second comparison signal;
   generating a slope signal;
   comparing the first comparison signal with the slope signal to provide a third comparison signal;
   comparing the second comparison signal with the slope signal to provide a fourth comparison signal;
   comparing the first comparison signal with a first reference inhibition signal to provide a fifth comparison result;
   comparing a second comparison signal with a second reference inhibition signal to provide a sixth comparison signal; and
   controlling the boost converter and the buck-boost converter in response to the third, fourth, fifth and sixth comparison signals, wherein a first output of the logic circuit, adapted to control the boost converter, delivers a signal having the logic equation:

$K1 = [((\overline{Q}+PWM1) \cdot \overline{OVBB}+(Q \cdot PWM1) \cdot OVBB)+OVB] \cdot (\overline{OVB}+\overline{OVBB})$, and a second output of the logic circuit, adapted to control the buck-boost converter, delivers a signal having the logic equation:

$K2 = [((Q+PWM2) \cdot \overline{OVB}+(\overline{Q} \cdot PWM2) \cdot OVB)+OVBB] \cdot (\overline{OVB}+\overline{OVBB})$, Q being a clock signal, $\overline{Q}$ being the inverse of the clock signal, PWM1, PWM2, OVB and OVBB being, respectively, the output signal of the third, fourth, fifth and sixth comparators, $\overline{OVB}$ and $\overline{OVBB}$ being, respectively, the inverse signals of OVB and OVBB.

13. A method as defined in claim 12, wherein the converters each include a chopper switch, further comprising turning off the chopper switches when the boost converter and the buck-boost converter require no power supply.

14. A method as defined in claim 12, further comprising:
   inhibiting the boost converter when a load associated with the boost converter requires no power and redistributing excess power to the buck-boost converter; and
   inhibiting the buck-boost converter when a load associated with the buck-boost converter requires no power and redistributing excess power to the boost converter.

* * * * *

UNITED STATES PATENT AND TRADEMARK OFFICE
CERTIFICATE OF CORRECTION

| | | |
|---|---|---|
| PATENT NO. | : 8,461,814 B2 | Page 1 of 1 |
| APPLICATION NO. | : 12/840674 | |
| DATED | : June 11, 2013 | |
| INVENTOR(S) | : Benoît Peron | |

It is certified that error appears in the above-identified patent and that said Letters Patent is hereby corrected as shown below:

In the Claims:

Claim 7, col. 11, line 44 should read:

$Q$ being a clock signal, $\overline{Q}$ being the inverse of the clock

Signed and Sealed this
Thirtieth Day of July, 2013

Teresa Stanek Rea
*Acting Director of the United States Patent and Trademark Office*